(12) United States Patent
Duthoit

(10) Patent No.: US 11,654,752 B2
(45) Date of Patent: May 23, 2023

(54) MOUNTING ASSEMBLY FOR A VEHICLE SUN VISOR

(71) Applicant: Daimay France SAS, Creutzwald (FR)

(72) Inventor: Guillaume Duthoit, Bambiderstroff (FR)

(73) Assignee: Fiarchild Fasteners Europe—VSD GMBH

( * ) Notice: Subject to any disclaimer, the term of this patent is extended or adjusted under 35 U.S.C. 154(b) by 156 days.

(21) Appl. No.: 17/312,817

(22) PCT Filed: Dec. 10, 2019

(86) PCT No.: PCT/EP2019/084384
§ 371 (c)(1),
(2) Date: Jun. 10, 2021

(87) PCT Pub. No.: WO2020/120453
PCT Pub. Date: Jun. 18, 2020

(65) Prior Publication Data
US 2022/0126655 A1   Apr. 28, 2022

(30) Foreign Application Priority Data

Dec. 12, 2018   (FR) ........................................ 1872809

(51) Int. Cl.
*B60J 3/02*        (2006.01)
(52) U.S. Cl.
CPC .................................. *B60J 3/0217* (2013.01)
(58) Field of Classification Search
CPC ........................................................ B60J 3/0217
USPC ............................................ 296/97.9, 97.12
See application file for complete search history.

(56) References Cited

U.S. PATENT DOCUMENTS

| | | | | |
|---|---|---|---|---|
| 5,098,151 A | * | 3/1992 | Peterson | B60J 3/0221 248/289.11 |
| 5,468,041 A | * | 11/1995 | Viertel | B60J 3/0221 248/222.52 |
| 7,415,751 B2 | * | 8/2008 | Kato | B60N 3/026 16/110.1 |

(Continued)

FOREIGN PATENT DOCUMENTS

| | | |
|---|---|---|
| DE | 3820334 C1 | 12/1989 |
| EP | 1057670 A1 | 12/2000 |

OTHER PUBLICATIONS

International Search Report and Written Opinion of the International Searching Authority dated Feb. 13, 2020, for PCT/EP2019/084384 filed Dec. 10, 2019, 14 pages.

*Primary Examiner* — Joseph D. Pape
(74) *Attorney, Agent, or Firm* — Boardman & Clark LLP

(57) ABSTRACT

A mounting assembly for a vehicle sun visor includes a mounting bracket having a first locking element and a first rotation element. The mounting assembly also includes a cover having a second locking element and a second rotation element. The first locking element is configured to engage the second locking element while the cover is in a transport position to block movement of the cover relative to the mounting bracket, the first rotation element is configured to engage the second rotation element while the cover is in an extended position to enable rotation of the cover relative to the mounting bracket, and the cover conceals a fastener opening of the mounting bracket while the cover is in the closed position.

20 Claims, 10 Drawing Sheets

(56) References Cited

U.S. PATENT DOCUMENTS

| | | | |
|---|---|---|---|
| 8,091,946 B2 * | 1/2012 | Huff | B60J 3/0221 296/97.9 |
| 2018/0251013 A1 | 9/2018 | Ibrahim | |

* cited by examiner

MOUNTING ASSEMBLY FOR A VEHICLE SUN VISOR

CROSS-REFERENCE TO RELATED APPLICATIONS

This application is a national phase filing of International Patent Application No. PCT/EP2019/084384, entitled "MOUNTING ASSEMBLY FOR A VEHICLE SUN VISOR," which has an international filing date of Dec. 10, 2019, which claims priority to French Patent Application No. 1872809 filed Dec. 12, 2018, the entire contents of each of which is hereby incorporated herein by reference for all purposes.

BACKGROUND

The disclosure relates generally to a mounting assembly for a vehicle sun visor.

Many vehicles employ sun visors to shield occupants from sunlight, thereby enabling the occupants to focus on the surrounding environment. For example, certain vehicles include sun visors positioned adjacent to a top portion of the windshield. Under certain lighting conditions, a driver may deploy the sun visor to reduce light transmission into the vehicle interior, thereby enabling the driver to focus on vehicle operations. Certain sun visors include a positioning assembly configured to enable the sun visor to rotate between a stowage position and a deployed position.

The sun visor is typically coupled to a structure of the vehicle (e.g., a roof panel, an interior panel, etc.) via a mounting assembly. The mounting assembly may include a mounting bracket and a fastener. The fastener may couple the mounting bracket to the vehicle structure, and a rod of the sun visor may be coupled (e.g., rotatably coupled) to the mounting bracket. Certain mounting assemblies include a cover configured to selectively conceal the fastener and to facilitate access to the fastener. For example, the cover may facilitate access to the fastener while the mounting assembly is being coupled to the vehicle structure, and the cover may be positioned to conceal the fastener after the coupling process is complete to enhance the appearance of the mounting assembly. In certain mounting assemblies, the cover is rotatably coupled to the mounting bracket by a living hinge that enables the cover to rotate between a position that facilitates access to the fastener and a position that conceals the fastener. Unfortunately, due to the flexibility of the living hinge, such a cover may detach from the mounting bracket during transport from the mounting assembly manufacturing facility to the vehicle in which the mounting assembly is to be installed.

BRIEF DESCRIPTION

In certain embodiments, a mounting assembly for a vehicle sun visor includes a mounting bracket configured to couple the vehicle sun visor to a structure of a vehicle. The mounting bracket has a fastener opening configured to receive a fastener, and the mounting bracket has a first locking element, a first rotation element, and a first engagement element. The mounting assembly also includes a cover configured to selectively conceal the fastener opening. The cover has a second locking element, a second rotation element, and a second engagement element. Furthermore, the first locking element is configured to engage the second locking element while the cover is in a transport position to block movement of the cover relative to the mounting bracket, the first rotation element is configured to engage the second rotation element while the cover is in an extended position to enable rotation of the cover relative to the mounting bracket, the first engagement element is configured to engage the second engagement element while the cover is in a closed position to block movement of the cover relative to the mounting bracket, and the cover conceals the fastener opening while the cover is in the closed position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
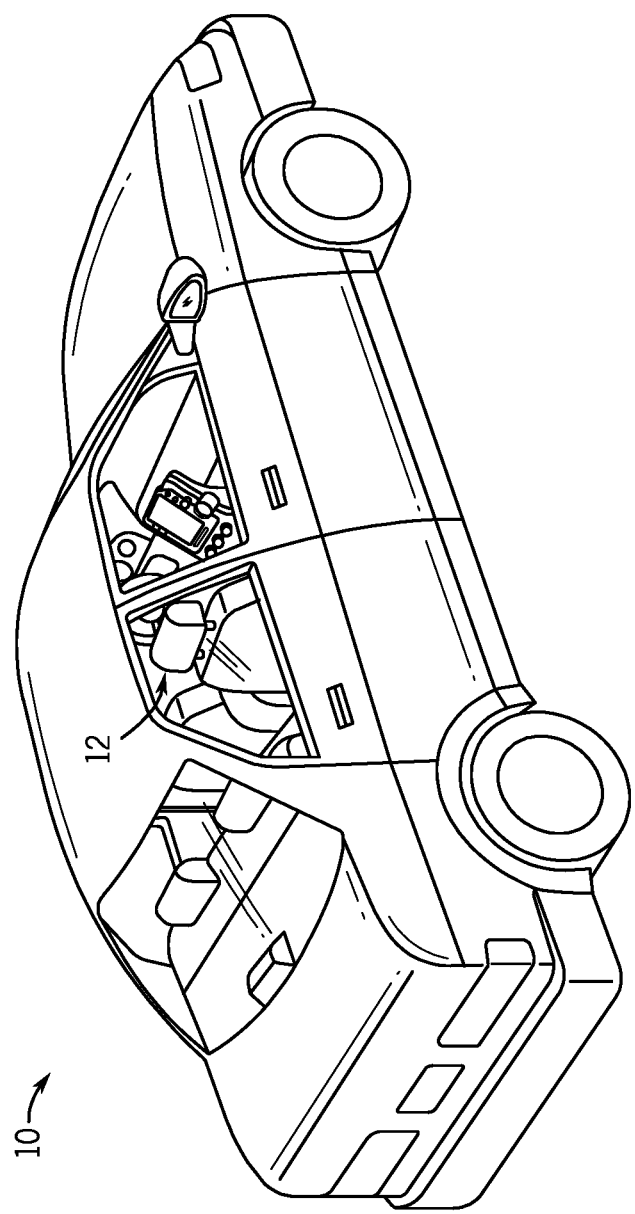
FIG. 1 is a perspective view of an embodiment of a vehicle that may include at least one sun visor coupled to a structure of the vehicle by a mounting assembly.

FIG. 1 is a perspective view of an embodiment of a vehicle 10 that may include at least one sun visor coupled to a structure of the vehicle by a mounting assembly. The sun visor(s) are positioned within an interior 12 of the vehicle 10 to shield vehicle occupant(s) from sunlight. Each sun visor may include a slide-on-rod assembly configured to enable the sun visor to rotate between a stowage position and a deployed position, and to enable the sun visor to slide from a retracted position to an extended position. In certain embodiments, the rod of the slide-on-rod assembly is coupled to the vehicle structure by the mounting assembly. While a slide-on-rod sun visor is disclosed herein, the mounting assembly described below may be utilized with any suitable type of sun visor (e.g., including a slide-on-rod sun visor, a sun visor having a fixed rod, a sun visor having a ball-joint connection to the mounting assembly, etc.).

In certain embodiments, the mounting assembly includes a mounting bracket configured to couple the sun visor to the vehicle structure. The mounting bracket has a fastener opening configured to receive a fastener, which may be configured to couple the mounting bracket to the vehicle structure. The mounting bracket also has a first locking element, a first rotation element, and a first engagement element. In addition, the mounting assembly includes a cover configured to selectively conceal the fastener opening of the mounting bracket. The cover has a second locking element, a second rotation element, and a second engagement element. The first locking element is configured to engage the second locking element while the cover is in a transport position (e.g., a position that facilitates transport of the mounting assembly from a manufacturing facility to a vehicle assembly facility) to block movement of the cover relative to the mounting bracket. Furthermore, the first rotation element is configured to engage the second rotation element while the cover is in an extended position to enable rotation of the cover relative to the mounting bracket. In addition, the first engagement element is configured to engage the second engagement element while the cover is in a closed position to block movement of the cover relative to the mounting bracket. The cover conceals the fastener opening while the cover is in the closed position. Because movement of the cover relative to the mounting bracket is blocked by the first and second locking elements while the cover is in the transport position, the possibility of the cover separating from the mounting bracket during transport from the mounting assembly manufacturing facility to the vehicle in which the mounting assembly is to be installed is substantially reduced (e.g., as compared to a mounting assembly having a cover rotatably coupled to the mounting bracket by a living hinge).

Figure 2:
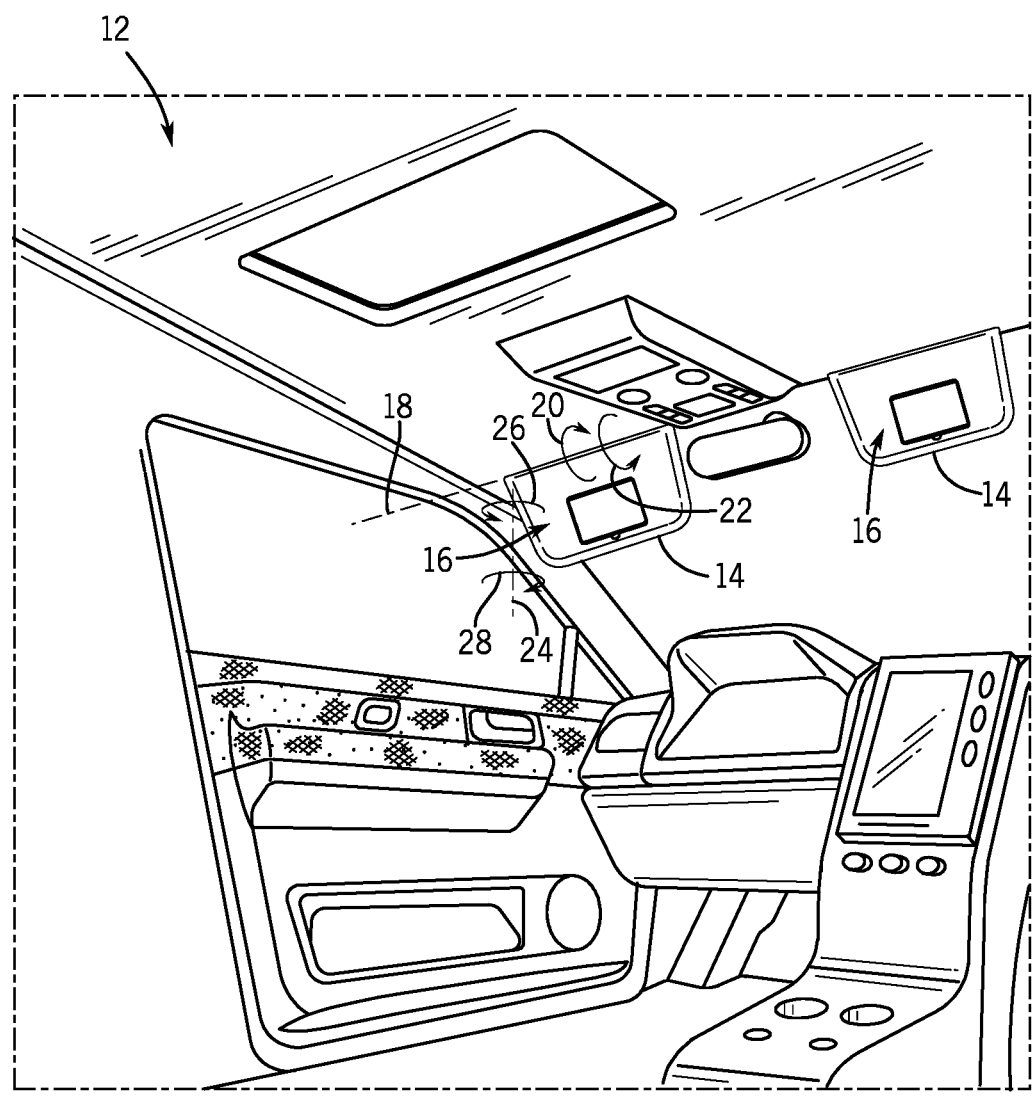
FIG. 2 is a perspective view of a part of the interior of the vehicle of FIG. 1, in which a sun visor is in a deployed position.

FIG. 2 is a perspective view of a part of the interior of the vehicle of FIG. 1, in which a sun visor is in a deployed position. In the illustrated embodiment, the vehicle interior 12 includes a sun visor 14 having a vanity mirror assembly 16. The vanity mirror assembly may include a mirror and a cover disposed over the mirror. A vehicle occupant may open the cover (e.g., via rotation of the cover or translation of the cover) to expose the mirror and close the cover (e.g., via rotation of the cover or translation of the cover) to conceal the mirror. While the illustrated sun visor 14 includes the vanity mirror assembly 16 in the illustrated embodiment, in other embodiments, the vanity mirror assembly may be omitted. In the illustrated embodiment, the sun visor 14 is configured to rotate about a rotational axis 18 between the illustrated usage position (e.g., deployed to reduce light transmission into the vehicle interior) and a stowage position (e.g., parallel to a headliner of the vehicle interior and/or in contact with the headliner). For example, to transition the sun visor 14 from the illustrated usage position to the stowage position, a vehicle occupant may rotate the sun visor 14 in a first rotational direction 20 about the rotational axis 18. Conversely, to transition the sun visor 14 from the stowage position to the illustrated usage position, the vehicle occupant may rotate the sun visor 14 in a second rotational direction 22 about the rotational axis 18.

In the illustrated embodiment, the sun visor 14 is also configured to rotate about a second rotational axis 24 between the illustrated usage position and a second usage position (e.g., proximate to a window of the vehicle to reduce light transmission through the window). For example, to transition the sun visor 14 from the illustrated usage position to the second usage position, a vehicle occupant may rotate the sun visor 14 in a third rotational direction 26 about the second rotational axis 24. Conversely, to transition the sun visor 14 from the second usage position to the illustrated usage position, the vehicle occupant may rotate the sun visor in a fourth rotational direction 28 about the second rotational axis 24. As discussed in detail below, the sun visor 14 may move between a retracted position and an extended position while in the second usage position.

Figure 3:
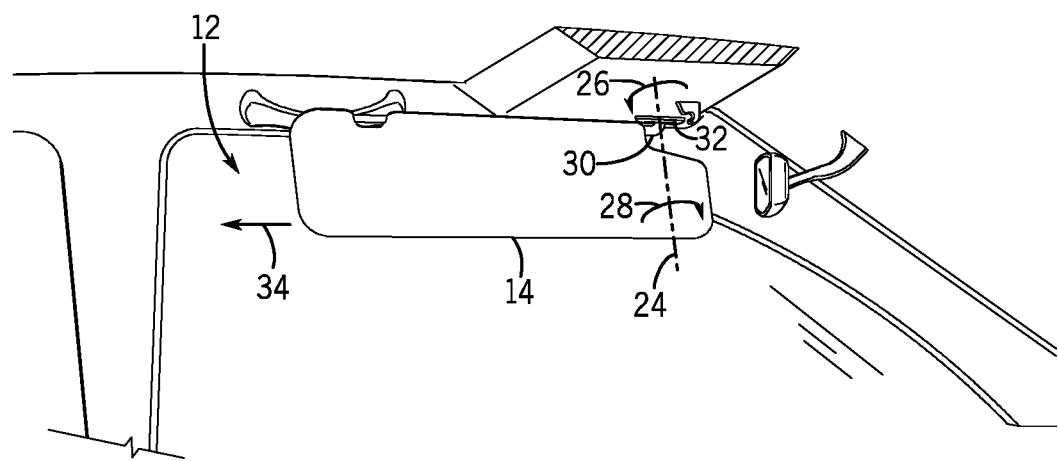
FIG. 3 is a perspective view of a part of the interior of the vehicle of FIG. 1, in which the sun visor is in a retracted position.

FIG. 3 is a perspective view of a part of the interior 12 of the vehicle of FIG. 1, in which the sun visor 14 is in a retracted position. As illustrated, the sun visor 14 is in the second usage position proximate to the window of the vehicle door. While the sun visor 14 is in the second usage position, the sun visor 14 may reduce light transmission through the window, thereby shielding the vehicle occupant from sunlight. In the illustrated embodiment, a rod 30 of the sun visor 14 is rotatably coupled to a mounting assembly 32. The mounting assembly 32, in turn, is coupled to a structure of the vehicle (e.g., a roof panel, an interior panel, etc.). The coupling between the rod 30 and the mounting assembly 32 enables the sun visor 14 to rotate about the second rotational axis 24 in the third and fourth rotational directions 26 and 28 between the usage positions (e.g., the illustrated second usage position and the usage position shown in FIG. 2). In addition, the rod 30 enables the sun visor 14 to rotate about the first rotational axis in the first and second rotational directions between the usage position shown in FIG. 2 and the stowage position.

In the illustrated embodiment, the sun visor 14 is configured to move in a first translational direction 34 from the illustrated retracted position to an extended position. For example, the sun visor may include a slide-on-rod assembly configured to enable the sun visor to slide relative to the rod 30. Accordingly, the sun visor may be moved between the illustrated retracted position and the extended position to enable an occupant to place the sun visor in a location that shields the occupant from sunlight.

Figure 4:
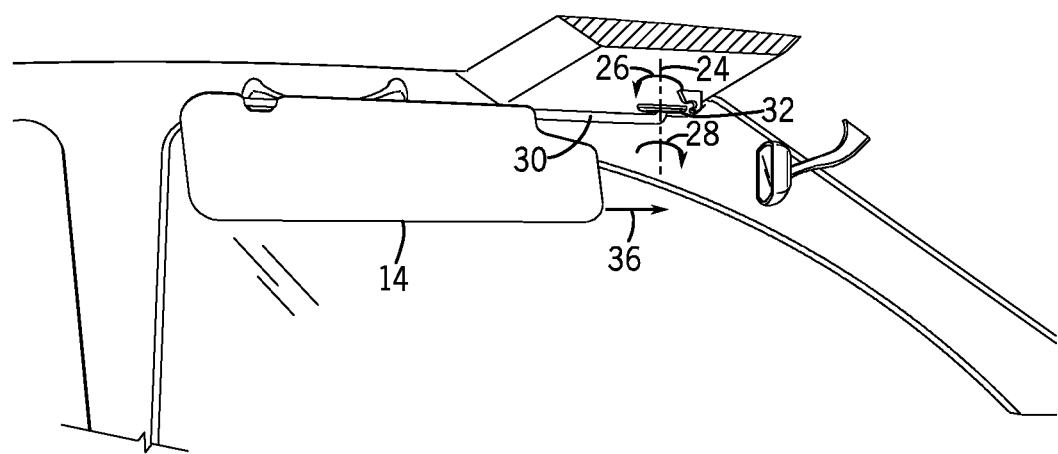
FIG. 4 is a perspective view of a part of the interior of the vehicle of FIG. 1, in which the sun visor is in an extended position.

FIG. 4 is a perspective view of a part of the interior of the vehicle of FIG. 1, in which the sun visor is in an extended position. As illustrated, while the sun visor 14 is in the extended position, the sun visor 14 may block sunlight passing through a rear portion of the window of the vehicle door. To transition the sun visor 14 from the illustrated extended position to the retracted position, the occupant may move the sun visor 14 in a second translational direction 36. Once in the retracted position, the occupant may rotate the sun visor in the third rotational direction 28 about the second rotational axis 24 to the usage position shown in FIG. 2. As previously discussed, the sun visor may rotate about the rod 30 between the usage position shown in FIG. 2 and the stowage position (e.g., about the first rotational axis in the first rotational direction 20).

Figure 5:
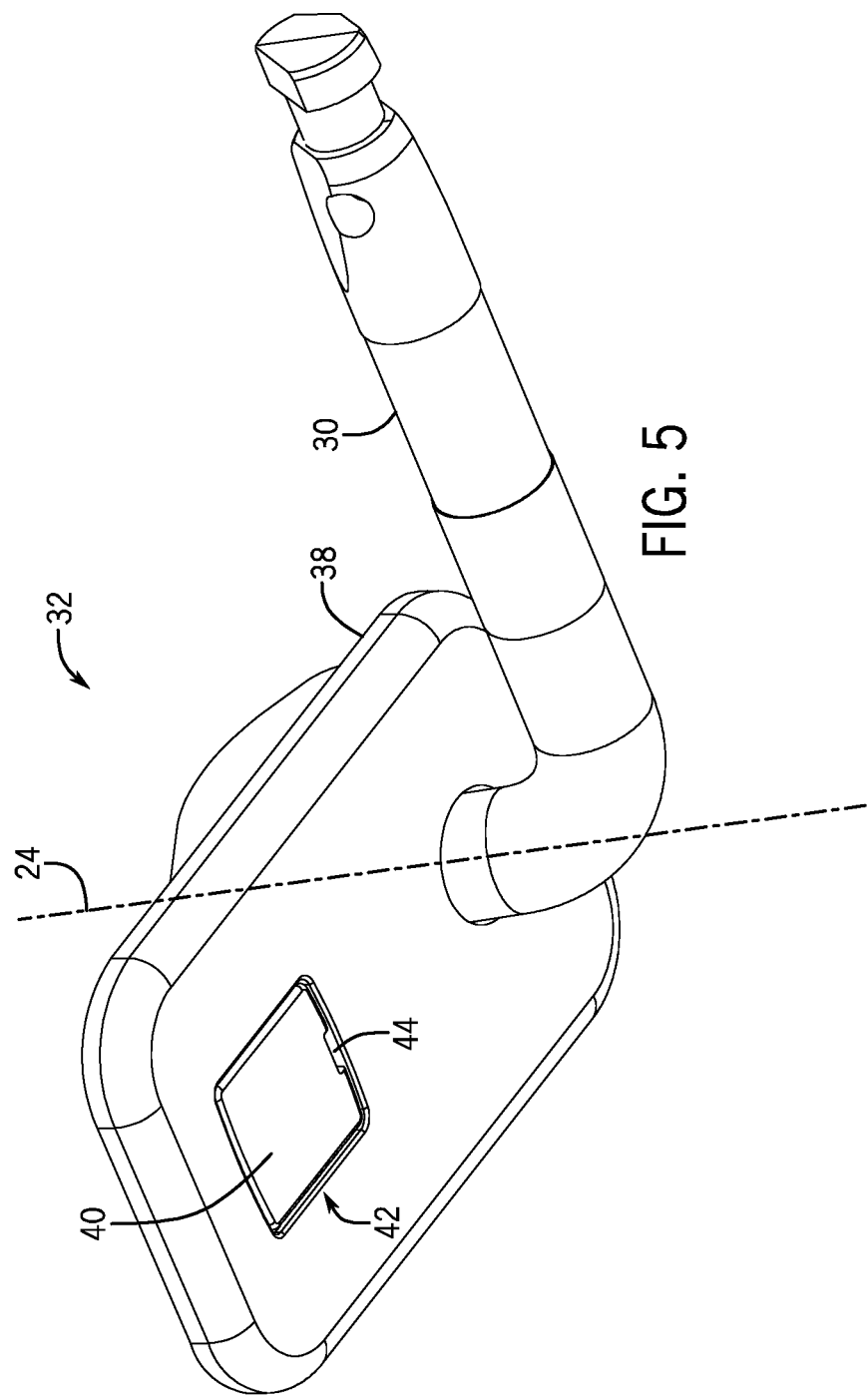
FIG. 5 is a perspective view of an embodiment of a mounting assembly that may be employed within the vehicle of FIG. 1 to couple a sun visor to a structure of the vehicle.

FIG. 5 is a perspective view of an embodiment of a mounting assembly 32 that may be employed within the vehicle of FIG. 1 to couple a sun visor to a structure of the vehicle. In the illustrated embodiment, the rod 30 of the sun visor is rotatably coupled to the mounting assembly 32, thereby enabling the sun visor to rotate about the rotational axis 24. Furthermore, in the illustrated embodiment, the mounting assembly 32 includes a mounting bracket 38 and a cover 40. As discussed in detail below, the mounting bracket 38 is configured to couple to the structure of the vehicle via a fastener, and the mounting bracket 38 has a fastener opening 42 configured to receive the fastener. The cover 40 is configured to selectively conceal the fastener opening 42, thereby enhancing the appearance of the mounting assembly 32 (e.g., as compared to a mounting assembly having an exposed fastener). As used herein, "conceal" refers to at least partially covering/concealing the fastener opening. For example, in certain embodiments, the cover may cover/conceal a substantially portion of the fastener opening, or the cover may cover/conceal all of the fastener opening.

As discussed in detail below, the cover 40 may be arranged in a transport position at the completion of the mounting assembly manufacturing process. While the cover is in the transport position, the fastener opening 42 is exposed, thereby facilitating access to the fastener. As the fastener is secured to the structure of the vehicle, contact between the cover and the vehicle structure may drive the cover to move to an extended position. Upon reaching the extended position, the cover 40 may be rotated to the illustrated closed position, thereby concealing the fastener/fastener opening. Engagement elements may block movement of the cover 40 relative to the mounting bracket 38 while the cover 40 is in the illustrated closed position. To access the fastener within the fastener opening 42, a tool may be inserted into a recess 44 of the cover 40. Movement of the tool may drive the engagement elements to disengage one another, thereby enabling the cover to rotate to the extended position, which facilitates access to the fastener.

Figure 6:
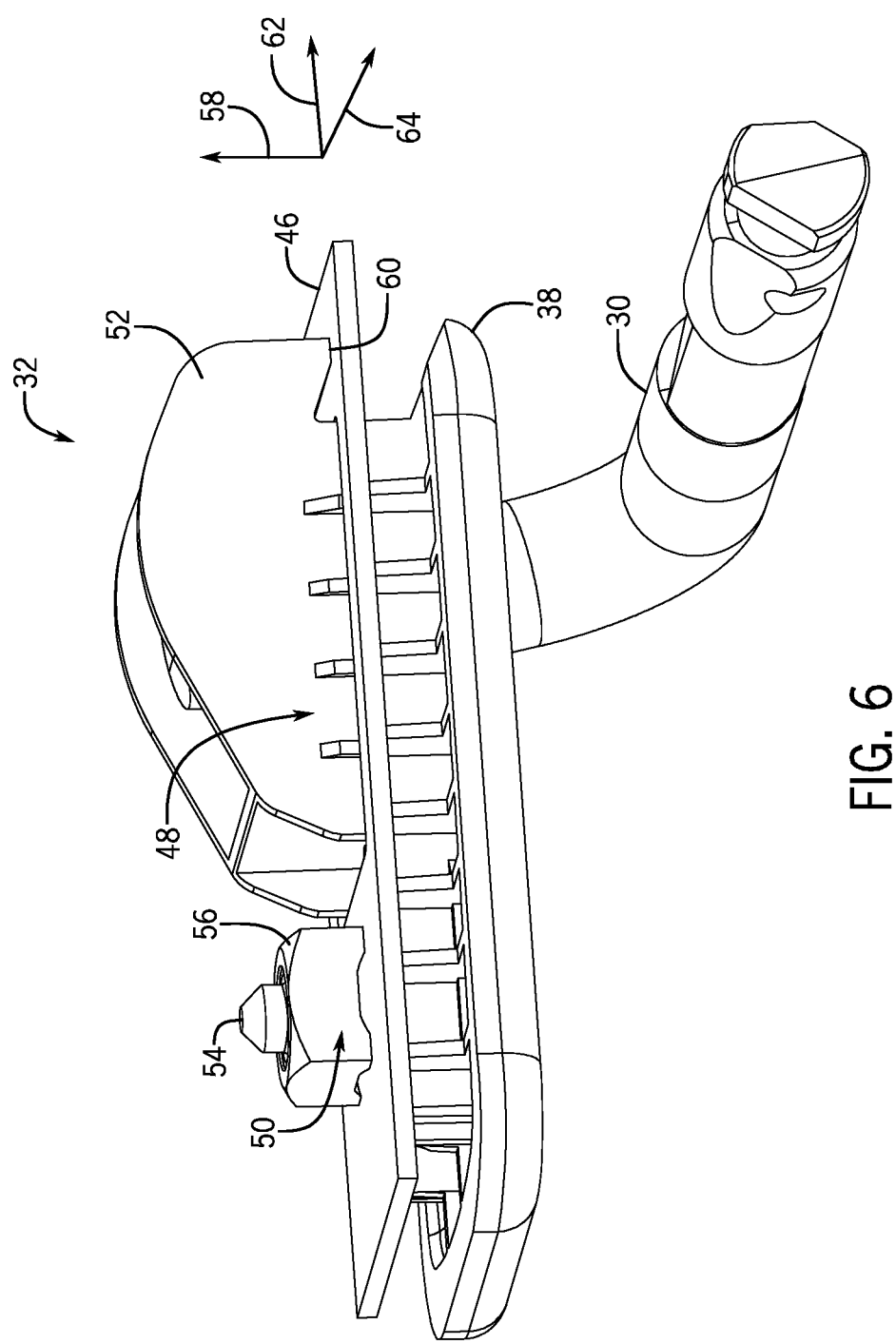
FIG. 6 is another perspective view of the mounting assembly of FIG. 5, in which the mounting assembly couples a rod of the sun visor to the structure of the vehicle.

FIG. 6 is another perspective view of the mounting assembly 32 of FIG. 5, in which the mounting assembly 32 couples the rod 30 of the sun visor to the structure 46 of the vehicle. In the illustrated embodiment, the structure 46 of the vehicle is a substantially flat plate having a hook opening 48 and a fastener opening 50. As discussed in detail below, the mounting bracket 38 may be coupled to the structure 46 via insertion of a hook 52 of the mounting bracket 38 through the hook opening 48 and insertion of a fastener 54 (e.g., bolt, screw, clip, etc.) through the fastener opening 50. In addition, the fastener 54 may be secured to a fastener retaining element 56 (e.g., nut, locking element, etc.), which may be coupled (e.g., non-rotatably coupled) to the structure 46. For example, prior to coupling the mounting bracket 38 to the vehicle structure 46, the mounting bracket may be oriented at an angle relative to the structure, thereby enabling the hook 52 to pass through the hook opening 48. The mounting bracket 38 may then be translated along a vertical axis 58, such that the hook 52 passes through the hook opening 48. The fastener 54 may then be inserted through the fastener opening 50. Engagement of the fastener 54 with the fastener retaining element 56 (e.g., via rotation of the fastener) may drive the mounting bracket 38 to rotate to the illustrated engaged position. Once the fastener 54 is engaged with the fastener retaining element 56, movement of the mounting bracket 38 along the vertical axis 58 relative to the structure 46 may be blocked by the fastener/fastener retaining element connection and contact between a contact surface 60 of the hook 52 and the structure 46. In addition, movement of the mounting bracket 38 relative to the vehicle structure 46 along a lateral axis 62 and along a longitudinal axis 64 is blocked by contact between the fastener 54 and the structure 46, and by contact between the hook 52 and the structure 46.

While the structure 46 of the vehicle is a substantially flat plate in the illustrated embodiment, in other embodiments, the vehicle structure coupled to the mounting bracket may be any suitable shape. Furthermore, while the mounting bracket is coupled to the vehicle structure via the hook and the fastener in the illustrated embodiment, in other embodiments, the mounting bracket may be coupled to the structure by the fastener alone, or by the fastener and another suitable connector, such as another fastener (e.g., a clip, a bolt, etc.). If another suitable connector is used, the structure may be configured to receive such a connector.

Figure 7:
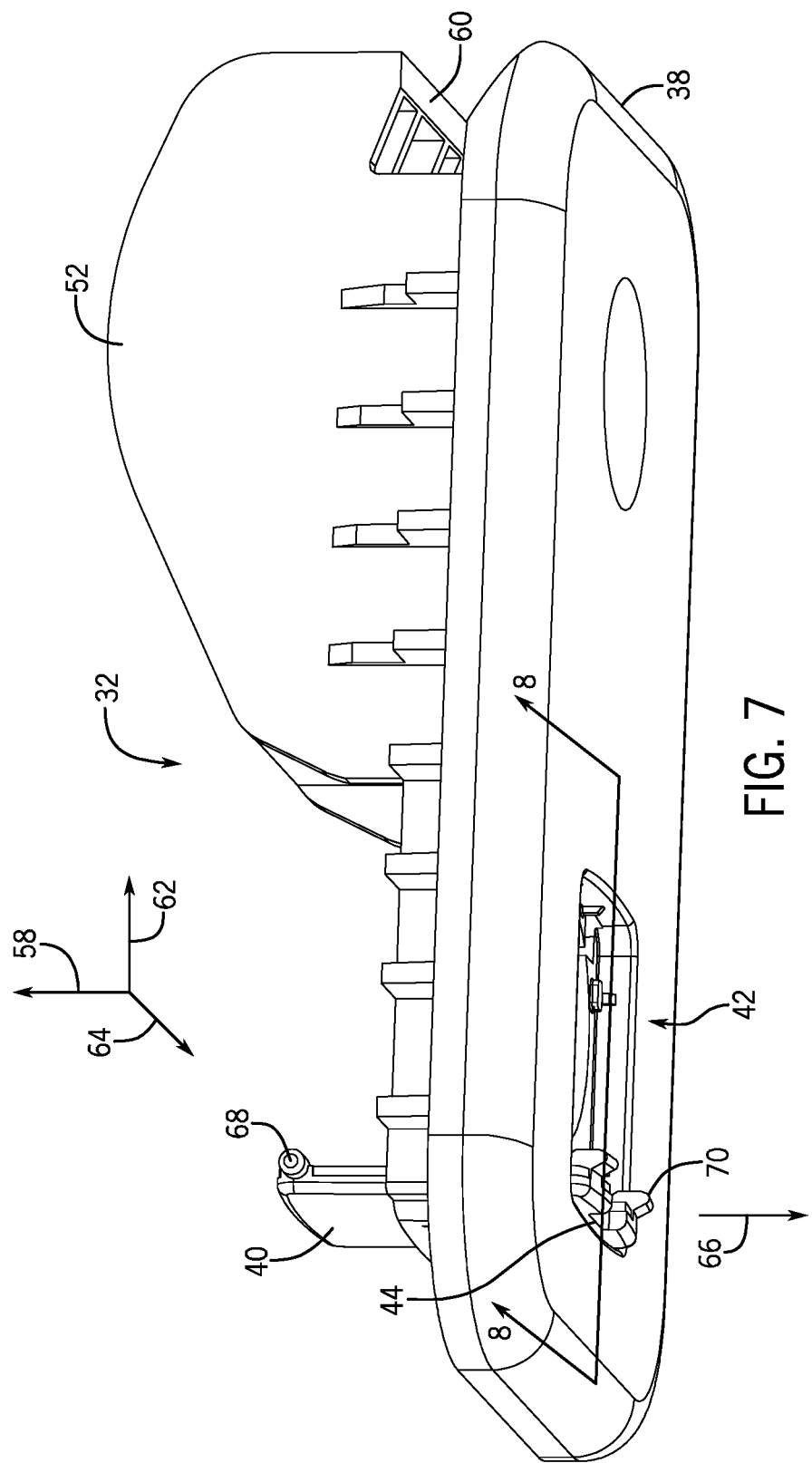
FIG. 7 is a perspective view of the mounting assembly of FIG. 5, in which a cover is in a transport position.

FIG. 7 is a perspective view of the mounting assembly 32 of FIG. 5, in which the cover 40 is in the transport position. The cover is arranged in the transport position during the manufacturing process of the mounting assembly (e.g., at the end of the manufacturing process), and the mounting assembly is transported from the mounting assembly manufacturing facility to the vehicle in which the mounting assembly is to be installed while the cover is in the illustrated transport position. While the cover 40 is in the illustrated transport position, access to the fastener opening 42 and the fastener within the opening is facilitated, thereby enabling the fastener to be engaged with the fastener retaining element (e.g., via rotation of the fastener).

As discussed in detail below, the mounting bracket 38 has a first locking element, and the cover 40 has a second locking element. The first locking element is configured to engage the second locking element while the cover 40 is in the illustrated transport position to block movement of the cover 40 relative to the mounting bracket 38 (e.g., along a cover translation axis 66). In the illustrated embodiment, the cover translation axis 66 is substantially parallel to the vertical axis 58. However, in other embodiments, the cover translation axis may extend in any suitable direction. Furthermore, the cover translation axis may be curved, such that the cover moves along a curved path between the illustrated transport position and the extended position. Because movement of the cover relative to the mounting bracket is blocked by the first and second locking elements while the cover is in the illustrated transport position, the possibility of the cover separating from the mounting bracket during transport from the mounting assembly manufacturing facility to the vehicle in which the mounting assembly is to be installed is substantially reduced (e.g., as compared to a mounting assembly having a cover rotatably coupled to the mounting bracket by a living hinge).

As discussed in detail below, the cover 40 may be driven to move along the cover translation axis 66 from the illustrated transport position to the extended position via application of a threshold force to the cover 40 along the cover translation axis 66. For example, as the fastener is engaged with the fastener retaining element, the mounting bracket may be driven toward the vehicle structure. Contact between the vehicle structure and the cover may cause the threshold force to be applied to the cover, thereby causing the cover to move toward the extended position. In the illustrated embodiment, the mounting bracket 38 has a first rotation element, and the cover 40 has a second rotation element 68. The first rotation element is configured to engage the second rotation element 68 while the cover 40 is in the extended position to enable rotation of the cover 40 relative to the mounting bracket 38. Accordingly, the cover 40 may be rotated (e.g., about the second rotation element 68) from the extended position to the closed position. Furthermore, in the illustrated embodiment, the mounting bracket 38 has a first engagement element, and the cover 40 has a second engagement element 70. The first engagement element is configured to engage the second engagement element while the cover is in the closed position to block movement of the cover 40 relative to the mounting bracket 38. Because the cover 40 conceals the fastener opening 42 and the fastener within the opening while the cover is in the closed position, the appearance of the mounting assembly may be enhanced.

Figure 8:
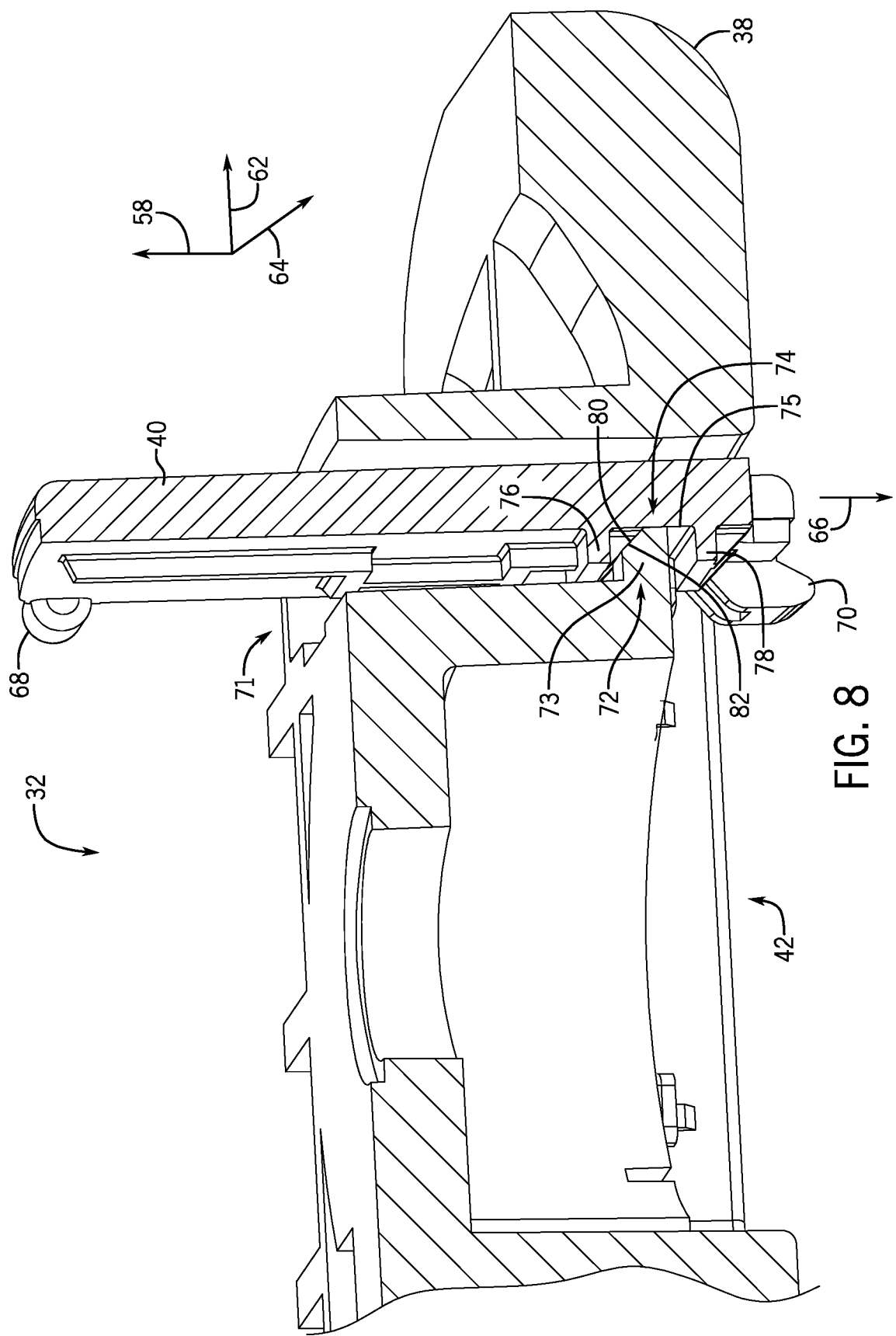
FIG. 8 is a cross-sectional view of the mounting assembly of FIG. 5, taken along line 8-8 of FIG. 7.

FIG. 8 is a cross-sectional view of the mounting assembly 32 of FIG. 5, taken along line 8-8 of FIG. 7. In the illustrated embodiment, the cover 40 is disposed within a passage 71 of the mounting bracket 38 and located in the transport position. As illustrated, a first locking element 72 is formed along the passage 71 of the mounting bracket 38 and is engaged with a second locking element 74 of the cover 40, thereby blocking movement of the cover 40 relative to the mounting bracket 38 (e.g., along the cover translation axis 66). In the illustrated embodiment, the first locking element 72 includes a protrusion 73, the second locking element 74 includes a recess 75, and the protrusion 73 engages the recess 75 while the cover 40 is in the transport position to block movement of the cover 40 relative to the mounting bracket 38 along the cover translation axis 66. As illustrated, the recess 75 is formed by a first wall 76 and a second wall 78. Furthermore, in the illustrated embodiment, the protrusion 73 has a first angled surface 80, and the first wall 76 has a second angled surface 82. Contact between the first angle surface 80 and the second angled surface 82 blocks movement of the cover 40 along the cover translation axis 66 from the illustrated transport position to the extended position, and contact between the protrusion 73 and the first wall 76 blocks movement of the cover 40 in the opposite direction. In addition, the first and second angled surfaces are configured to drive the protrusion and/or the cover to deform (e.g., along the lateral axis 62) in response to application of a threshold force to the cover along the cover translation axis (e.g., in a direction that urges the cover to move from the transport position to the extended position), thereby enabling the cover 40 to move along the cover translation axis from the illustrated transport position to the extended position (e.g., under the influence of gravity). As previously discussed, the threshold force may be applied to the cover by the vehicle structure as the fastener is engaged with the fastener retaining element. Accordingly, the first and second locking elements may maintain the cover in the illustrated transport position until the fastener is engaged with the fastener retaining element during installation of the mounting assembly within the vehicle.

While the protrusion and the first wall of the recess have angled surfaces in the illustrated embodiment, in other embodiments, at least one of the protrusion and the wall may have another suitable contact surface shape. For example, in certain embodiments, at least one contact surface may be curved, polygonal, or substantially flat, among other suitable shapes. Furthermore, while the first locking element includes a single protrusion in the illustrated embodiment, the first locking element may include additional protrusions (e.g., 1, 2, 3, 4, or more) in other embodiments. In addition, while the second locking element includes a single recess in the illustrated embodiment, in other embodiments, the second locking element may include additional recesses (e.g., one recess for each protrusion of the first locking element). While the first locking element includes a protrusion and the second locking element includes a recess in the illustrated embodiment, in other embodiments, the first locking element may include a recess, and the second locking element may include a protrusion. In further embodiments, the first and second locking elements may include any other suitable structure(s) configured to selectively block movement of the cover relative to the mounting bracket (e.g., along the cover translation axis).

Figure 9:
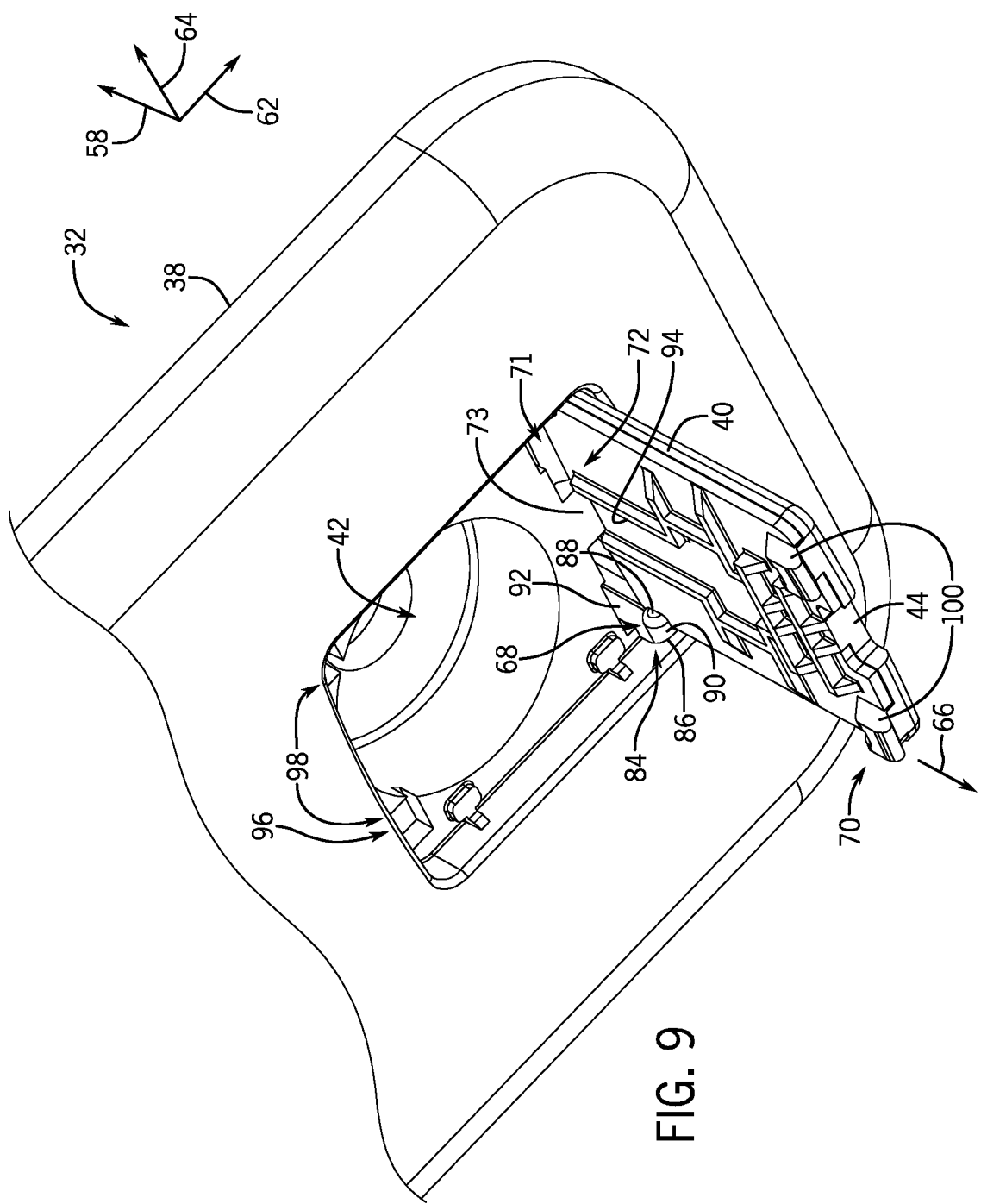
FIG. 9 is a perspective view of the mounting assembly of FIG. 5, in which the cover is in an extended position.

FIG. 9 is a perspective view of the mounting assembly 32 of FIG. 5, in which the cover 40 is in an extended position. With the cover in the illustrated extended position, the first rotation element 84 of the mounting bracket 38, which is formed at a base of the passage 71, is engaged with the second rotation element 68 of the cover 40. As previously discussed, engagement of the first and second rotation elements enables the cover 40 to rotate from the illustrated extended position to the closed position, in which the cover 40 conceals the fastener opening 42. In the illustrated embodiment, the first rotation element 84 includes an arcuate recess 86, and the second rotation element 68 includes a protrusion 88 having a curved surface 90. The arcuate recess 86 (e.g., a surface forming the arcuate recess) engages the curved surface 90 of the protrusion 88 while the cover 40 is in the illustrated extended position, thereby enabling the cover 40 to rotate about the protrusion from the extended position to the closed position. In the illustrated embodiment, the first rotation element includes two arcuate recesses, one on each longitudinal side of the fastener opening, and the second rotation element includes two corresponding protrusions, one on each longitudinal side of the cover. However, in other embodiments, the first rotation element may include a single arcuate recess, and the second rotation element may include a single corresponding protrusion.

Furthermore, in the illustrated embodiment, the mounting bracket 38 has a groove 92 extending from the arcuate recess 86 along the passage 71. The groove 92 is configured to receive the protrusion 88 and to guide the cover 40 from the transport position to the illustrated extended position along the cover translation axis 66. In certain embodiments, the mounting bracket may include a second groove position on the opposite longitudinal side of the fastener opening from the illustrated groove, and the second groove may be configured to receive a second protrusion of the second rotation element. In addition, in the illustrated embodiment, the protrusion 73 of the first locking element 72 is configured to engage a groove 94 in the cover 40 to guide the cover 40 from the transport position to the illustrated extended position along the cover translation axis 66. While the illustrated mounting assembly 32 includes both the protrusion 88/groove 92 arrangement and the protrusion 73/groove 94 arrangement to guide the cover from the transport position to the extended position, in other embodiments, the mounting assembly may include fewer protrusion/groove arrangements (e.g., no protrusion/groove arrangements) and/or other/additional elements configured to guide the cover from the transport positon to the extended position.

While the first rotation element includes an arcuate recess and the second rotation element includes a protrusion having a curved surface in the illustrated embodiment, in other embodiments, the first rotation element may include a protrusion having a curved surface and the second rotation element may include an arcuate recess. Furthermore, in certain embodiments, the first and second rotation elements may include other suitable structures configured to facilitates rotation of the cover in response to engagement of the rotation elements. For example, the first rotation element may include a cam surface, and the second rotation element may include a follower configured to engage the cam surface.

As illustrated, the first engagement element 96 is positioned on an opposite side of the fastener opening 42 from the passage 71 (e.g., along the lateral axis 62). As previously discussed, the first engagement element 96 of the mounting bracket 38 is configured to engage the second engagement element 70 of the cover 40 while the cover is in the closed position. Engagement of the first engagement element 96 with the second engagement element 70 blocks movement of the cover 40 relative to the mounting bracket 30, thereby maintaining the cover 40 in the closed position such that the fastener opening 42 is concealed. In the illustrated embodiment, the first engagement element includes two recesses 98, one positioned on each longitudinal side of the fastener opening 42. In addition, the second engagement element 70 includes two protrusions 100, one positioned on each longitudinal side of the cover 40. The protrusions 100 are configured to engage the respective recesses 98 while the cover 40 is in the closed position, thereby blocking movement of the cover 40 relative to the mounting bracket (e.g., rotation of the cover about the protrusions 88 of the second rotation element 68).

While the first engagement element includes two recesses in the illustrated embodiment, in other embodiments, the first engagement element may include more or fewer recesses (e.g., 1, 2, 3, 4, or more). In addition, while the second engagement element includes two protrusions in the illustrated embodiment, in other embodiments, the second engagement element may include more or fewer protrusions (e.g., a number of protrusions corresponding to the number of recess of the first engagement element). Furthermore, while the first engagement element includes one or more recesses and the second engagement element includes one or more corresponding protrusions in the illustrated embodiment, in other embodiments, the first engagement element may include one or more protrusions and the second engagement element may include one or more corresponding recesses. Furthermore, in certain embodiments, the first and second engagement elements may include other suitable structures configured to block movement of the cover in response to engagement of the engagement elements. For example, the first engagement element may include a latch, the second engagement element may include a protrusion, and the protrusion may engage the latch upon contact.

As previously discussed, the cover 40 has a recess 44 configured to facilitate insertion of a tool to drive the first and second engagement elements to disengage one another while the cover is in the closed position. Accordingly, the cover may be transitioned from the closed position to the illustrated extended position using the tool. While the cover is in the illustrated extended position, access to the fastener is provided, thereby enabling removal of the fastener (e.g., to remove the mounting assembly and the sun visor from the vehicle interior). While the illustrated cover includes a recess to facilitate insertion of a tool, in other embodiments, the cover may include an opening configured to facilitate insertion of a tool, or another suitable system configured to drive the engagement elements to disengage one another (e.g., a button, a latch, etc.).

Figure 10:
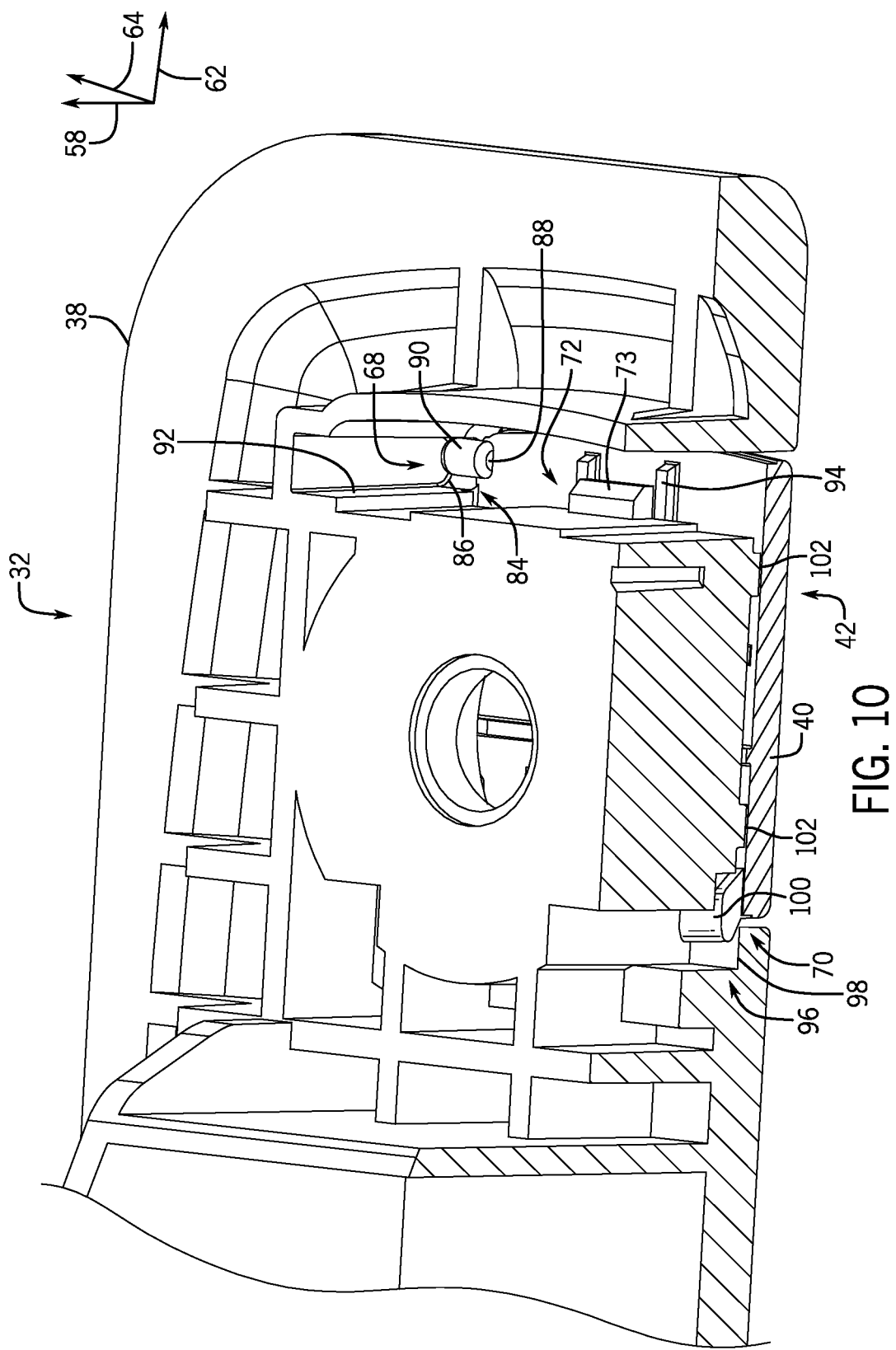
FIG. 10 is a cross-sectional view of the mounting assembly of FIG. 5, in which the cover is in a closed position.

FIG. 10 is a cross-sectional view of the mounting assembly 32 of FIG. 5, in which the cover 40 is in the closed position. As illustrated, the protrusion 100 of the second engagement element 70 is engaged with the recess 98 (e.g., a surface forming the recess) of the second engagement element 96. In addition, the protrusion 88 of the second rotation element 68 is engaged with the arcuate recess 86 of the first rotation element 84. Accordingly, movement of the cover 40 away from the mounting bracket 38 along the vertical axis 58 is blocked. In addition, contact between the cover 40 and protrusions 102 of the mounting bracket 38 blocks movement of the cover 40 toward the mounting bracket 38 along the vertical axis 58. While the mounting bracket includes protrusions in the illustrated embodiment, in other embodiments, the mounting bracket may include other suitable surface(s) to block movement of the cover toward the mounting bracket along the vertical axis.

While the protrusions 88 of the second rotation element 68 are positioned proximate to an end of the cover 40 (e.g., an end of the cover 40 along the lateral axis 62 while the cover 40 is in the illustrated closed position) in the illustrated embodiment, in other embodiments, the protrusions may be positioned at another suitable location along the cover (e.g., along the lateral axis 62 while the cover is in the illustrated closed position). In such embodiments, the first rotation element 84 may be positioned at a corresponding location along the fastener opening 42 (e.g., along the lateral axis 62). Furthermore, the diameter of the protrusions 88 of the second rotation element 68 may be particularly selected to position the rotational axis of the cover in a target location. The diameter of the respective arcuate recesses 86 may substantially correspond to the diameter of the protrusions 88.

Figure 11:
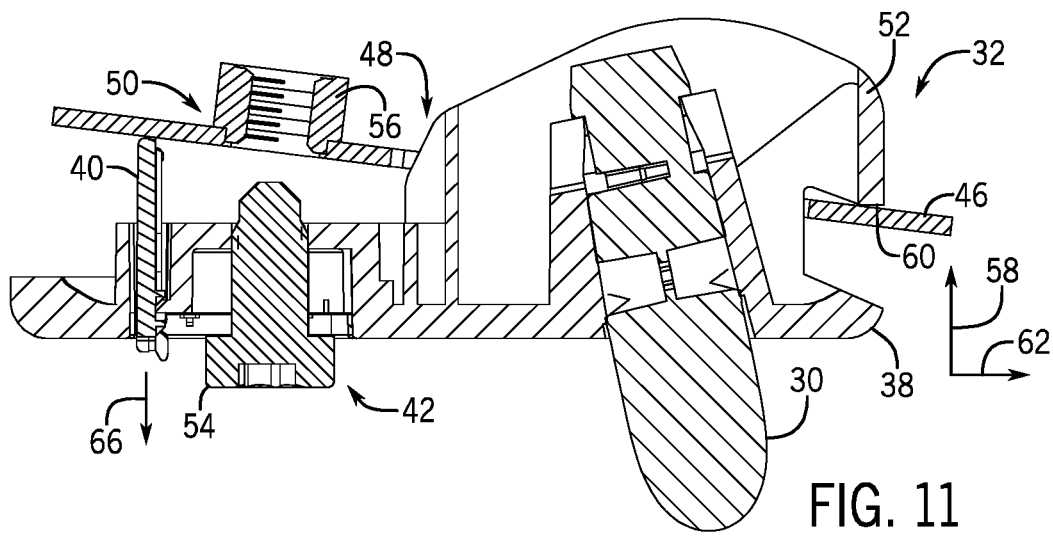
FIG. 11 is a cross-sectional view of the mounting assembly of FIG. 5, in which a hook of a mounting bracket is engaged with the structure of the vehicle.
Figure 12:
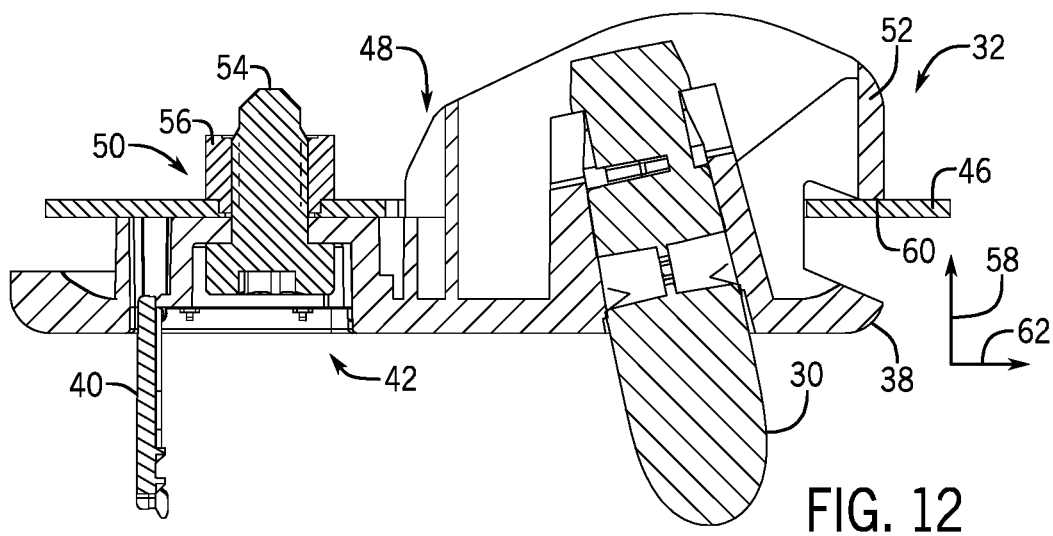
FIG. 12 is a cross-sectional view of the mounting assembly of FIG. 5, in which a fastener is engaged with a fastener retaining element.
Figure 13:
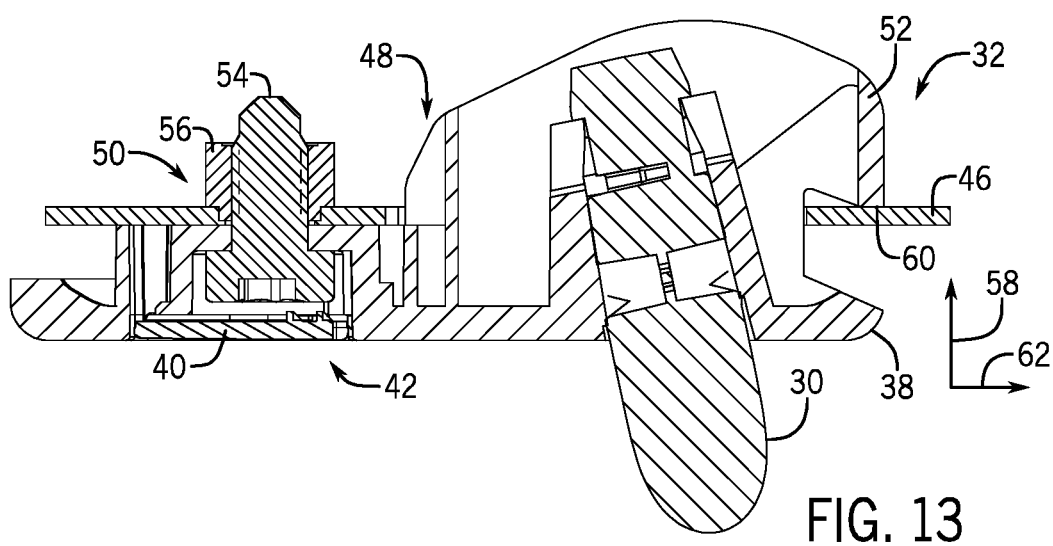
FIG. 13 is a cross-sectional view of the mounting assembly of FIG. 5, in which the cover is in the closed position.

FIGS. 11-13 show the process of coupling the mounting assembly 32 to the vehicle structure. First, FIG. 11 is a cross-sectional view of the mounting assembly 32 of FIG. 5, in which the hook 52 of a mounting bracket 38 is engaged with the structure 46 of the vehicle. As previously discussed, prior to coupling the mounting bracket 38 to the vehicle structure 46, the mounting bracket may be oriented at an angle relative to the structure, thereby enabling the hook 52 to pass through the hook opening 48. The mounting bracket 38 may then be translated along the vertical axis 58 toward the vehicle structure 46, such that the hook 52 passes through the hook opening 48. Finally, the mounting bracket 38 may be rotated such that the contact surface 60 of the hook contacts a top side of the structure 46, and the cover 40, while in the illustrated transport position, contacts a bottom side of the structure 46.

FIG. 12 is a cross-sectional view of the mounting assembly 32 of FIG. 5, in which the fastener 54 is engaged with the fastener retaining element 56. Between the installation state shown in FIG. 11 and the installation state shown in FIG. 12, the fastener 54 may be translated along the vertical axis 58, such that the fastener passes through the fastener opening 50 and contacts the fastener retaining element 56. In the illustrated embodiment, the fastener has a threaded shaft. Accordingly, rotation of the fastener 54 while the threaded shaft is in contact with the fastener retaining element (e.g., threaded nut) drives the fastener to engage the fastener retaining element. In addition, the process of engagement of the fastener with the fastener retaining element drives the mounting bracket to rotate about the contact surface 60 of the hook. As the mounting bracket rotates, the structure 46 applies a sufficient force to the cover 40 along the cover translation axis 66 to cause the first and second locking elements to disengage, thereby enabling the cover 40 to move along the cover translation axis 66 (e.g., under the influence of gravity) from the transport position shown in FIG. 11 to the illustrated extended position. As previously discussed, with the cover 40 in the illustrated extended position, the first and second rotation elements engage one another, thereby enabling the cover to rotate from the illustrated extended position to the closed position.

FIG. 13 is a cross-sectional view of the mounting assembly 32 of FIG. 5, in which the cover 40 is in the closed position. As the cover 40 is rotated to the closed position, the first and second engagement elements engage one another, thereby blocking movement of the cover relative to the mounting bracket. To rotate the cover from the illustrated closed position to the extended position (e.g., to access the fastener), a tool may be inserted into the recess of the cover to drive the first and second engagement elements to disengage one another, thereby enabling the cover to rotate to the extended position shown in FIG. 12 (e.g., under the influence of gravity).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mounting assembly for a vehicle sun visor, comprising:
 a mounting bracket configured to couple the vehicle sun visor to a structure of a vehicle, wherein the mounting bracket has a fastener opening configured to receive a fastener, and the mounting bracket has a first locking element, a first rotation element, and a first engagement element; and
 a cover configured to selectively conceal the fastener opening, wherein the cover has a second locking element, a second rotation element, and a second engagement element;
 wherein the first locking element is configured to engage the second locking element while the cover is in a transport position to block movement of the cover relative to the mounting bracket, the first rotation element is configured to engage the second rotation element while the cover is in an extended position to enable rotation of the cover relative to the mounting bracket, the first engagement element is configured to engage the second engagement element while the cover is in a closed position to block movement of the cover relative to the mounting bracket, and the cover conceals the fastener opening while the cover is in the closed position.

2. The mounting assembly of claim 1,
 wherein the first locking element comprises a protrusion, the second locking element comprises a recess, and the protrusion is configured to engage the recess while the cover is in the transport position to block movement of the cover relative to the mounting bracket along a cover translation axis.

3. The mounting assembly of claim 2,
 wherein the protrusion has a first angled surface, a wall forming the recess has a second angled surface configured to contact the first angled surface, and the first and second angled surfaces are configured to drive the protrusion, the cover, or a combination thereof, to deform in response to application of a threshold force to the cover along the cover translation axis to enable the cover to move from the transport position to the extended position along the cover translation axis.

4. The mounting assembly of claim 1,
 wherein the first rotation element comprises an arcuate recess, the second rotation element comprises a protrusion having a curved surface, and the arcuate recess is configured to engage the curved surface of the protrusion while the cover is in the extended position to enable the cover to rotate from the extended position to the closed position.

5. The mounting assembly of claim 4,
 wherein the mounting bracket has a groove extending from the arcuate recess, and the groove is configured to receive the protrusion and to guide the cover from the transport position to the extended position along a cover translation axis.

6. The mounting assembly of claim 1,
 wherein the first engagement element comprises a recess, the second engagement element comprises a protrusion, and the protrusion is configured to engage the recess while the cover is in the closed position to block movement of the cover relative to the mounting bracket.

7. The mounting assembly of claim 1,
 wherein the cover has a recess configured to facilitate insertion of a tool to drive the first engagement element to disengage the second engagement element while the cover is in the closed position.

8. A mounting assembly for a vehicle sun visor, comprising:
 a cover; and
 a mounting bracket configured to couple the vehicle sun visor to a structure of a vehicle, wherein the mounting bracket comprises:
  a fastener opening configured to receive a fastener;
  a passage configured to receive the cover, wherein a first locking element is formed along the passage, and a first rotation element is formed at a base of the passage; and
  a first engagement element positioned on an opposite side of the fastener opening from the passage;
 wherein the cover comprises:
 a second locking element configured to engage the first locking element while the cover is in a transport position within the passage to block movement of the cover relative to the mounting bracket along a cover translation axis;
 a second rotation element configured to engage the first rotation element while the cover is in an extended position to enable the cover to rotate from the extended position to a closed position; and a second engagement element configured to engage the first engagement element while the cover is in the closed position, wherein the cover conceals the fastener opening while the cover is in the closed position.

9. The mounting assembly of claim 8,
wherein the first locking element comprises a protrusion, the second locking element comprises a recess, and the protrusion is configured to engage the recess while the cover is in the transport position to block movement of the cover relative to the mounting bracket along the cover translation axis.

10. The mounting assembly of claim 9,
wherein the protrusion has a first angled surface, a wall forming the recess has a second angled surface configured to contact the first angled surface, and the first and second angled surfaces are configured to drive the protrusion, the cover, or a combination thereof, to deform in response to application of a threshold force to the cover along the cover translation axis to enable the cover to move from the transport position to the extended position along the cover translation axis.

11. The mounting assembly of claim 8,
wherein the first rotation element comprises an arcuate recess, the second rotation element comprises a protrusion having a curved surface, and the arcuate recess is configured to engage the curved surface of the protrusion while the cover is in the extended position to enable the cover to rotate from the extended position to the closed position.

12. The mounting assembly of claim 11,
wherein the mounting bracket has a groove extending from the arcuate recess along the passage, and the groove is configured to receive the protrusion and to guide the cover from the transport position to the extended position along the cover translation axis.

13. The mounting assembly of claim 8,
wherein the first engagement element comprises a recess, the second engagement element comprises a protrusion, and the protrusion is configured to engage the recess while the cover is in the closed position to block movement of the cover relative to the mounting bracket.

14. The mounting assembly of claim 8,
wherein the cover has a recess configured to facilitate insertion of a tool to drive the first engagement element to disengage the second engagement element while the cover is in the closed position.

15. A mounting assembly for a vehicle sun visor, comprising:
a mounting bracket configured to couple the vehicle sun visor to a structure of a vehicle, wherein the mounting bracket has a fastener opening configured to receive a fastener, and the mounting bracket has a first locking element and a first rotation element; and a cover configured to selectively conceal the fastener opening, wherein the cover has a second locking element and a second rotation element;

wherein the first locking element is configured to engage the second locking element while the cover is in a transport position to block movement of the cover relative to the mounting bracket along a cover translations axis, the first locking element and the second locking element are configured to disengage in response to application of a threshold force along the cover translation axis to enable the cover to move from the transport position to an extended position along the cover translation axis, the first rotation element is configured to engage the second rotation element while the cover is in the extended position to enable rotation of the cover from the extended position to a closed position, and the cover conceals the fastener opening while the cover is in the closed position.

16. The mounting assembly of claim 15,
wherein the mounting bracket has a first engagement element, the cover has a second engagement element, and the first engagement element is configured to engage the second engagement element while the cover is in the closed position to block movement of the cover relative to the mounting bracket.

17. The mounting assembly of claim 16,
wherein the first engagement element comprises a recess, the second engagement element comprises a protrusion, and the protrusion is configured to engage the recess while the cover is in the closed position to block movement of the cover relative to the mounting bracket.

18. The mounting assembly of claim 16,
wherein the cover has a recess configured to facilitate insertion of a tool to drive the first engagement element to disengage the second engagement element while the cover is in the closed position.

19. The mounting assembly of claim 15,
wherein the first locking element comprises a protrusion, the second locking element comprises a recess, and the protrusion is configured to engage the recess while the cover is in the transport position to block movement of the cover relative to the mounting bracket along the cover translation axis.

20. The mounting assembly of claim 15,
wherein the first rotation element comprises an arcuate recess, the second rotation element comprises a protrusion having a curved surface, and the curved surface of the protrusion is configured to engage the arcuate recess while the cover is in the extended position to enable rotation of the cover from the extended position to the closed position.

\* \* \* \* \*